March 18, 1958 W. R. LOESER ET AL 2,827,502
MANUFACTURE OF HALOGENATED AROMATIC HYDROCARBONS
Filed Feb. 17, 1954
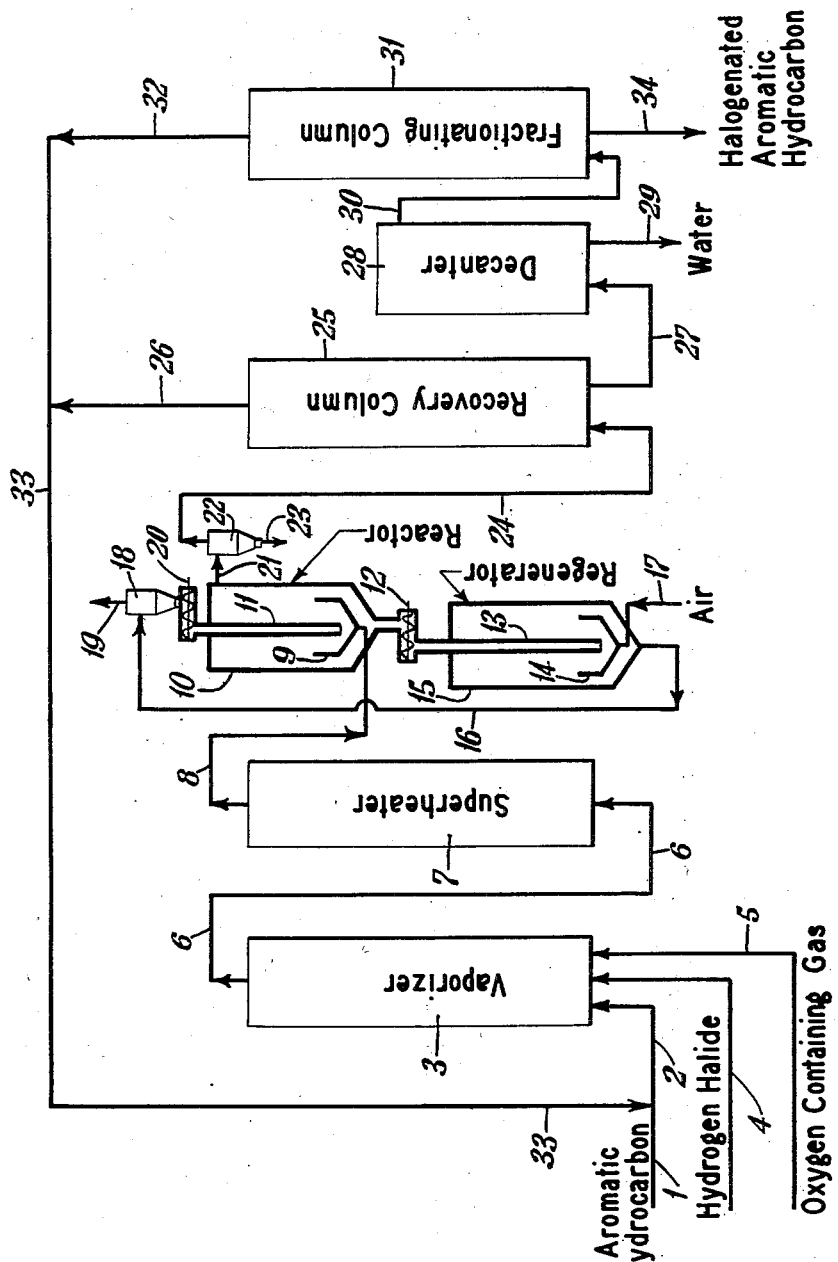
INVENTORS
WILFRED R. LOESER
JOHN H. SCHMIDT
BY
ATTORNEY United States Patent Office 2,827,502
Patented Mar. 18, 1958

2,827,502

MANUFACTURE OF HALOGENATED AROMATIC HYDROCARBONS

Wilfred R. Loeser, New Brunswick, and John H. Schmidt, Upper Montclair, N. J., assignors to Union Carbide Corporation, a corporation of New York Application February 17, 1954, Serial No. 410,961

2 Claims. (Cl. 260—650)

This invention relates to an improved method for carrying out the halogenation of aromatic hydrocarbons and more particularly relates to the chlorination of benzene.

Halogenated hydrocarbons are of great industrial importance as base materials in the production of many chemicals. Monochlorobenzene, for example, is used commercially as a reactive intermediate for the production of phenol.

It is known in the art that chlorobenzene can be produced by reacting benzene, hydrogen chloride and air in the presence of a fixed bed of a suitable catalyst. One such process involves continuously passing a vaporous mixture of benzene, hydrochloric acid and air through a fixed bed of catalyst and recycling unreacted components back through the catalyst bed. The catalyst employed in this operation usually comprises a chloride of a metal having a variable valence or an oxide of a metal having a variable valence which will convert to the corresponding chloride in the presence of hydrogen chloride. A suitable catalyst of this type is cupric chloride, which readily contributes chlorine atoms for the chlorination of benzene and reduces to a lower valence state, i. e. cuprous chloride. The higher valence state is again obtained when the cuprous chloride accepts chlorine atoms from the hydrogen chloride and is converted to cupric chloride.

Although this process for producing chlorobenzene is apparently continuous in nature, it actually involves periods of inoperation, occurring every three to six months, during which the reaction must be completely stopped and the chloride catalyst in the reactor completely replaced or regenerated. Regeneration of the catalyst which normally comprises burning off the tars and other residual matter formed on the catalyst during the chlorination reaction, is generally considered uneconomical in view of the heat requirements and explosion hazards involved. Such a regeneration requires an initial purge of the catalyst with steam in order to remove entrapped benzene and monochlorobenzene, which would otherwise violently react with the regenerating air in an explosive manner. The steam purge results in both heat losses and product losses. For these reasons when the process is shut down due to lowered catalyst activity, spent catalyst is usually removed and replaced with fresh catalyst. One of the big problems that arises due to such shutdowns relates to corrosion, since the reduced temperatures during shutdowns result in water condensation and concomitant corrosion of the reaction vessels.

We propose to overcome the above disadvantages by providing a continuous process for halogenating an aromatic hydrocarbon which requires no shutdowns for catalyst regeneration or replacement and which is simpler, more economical and more efficient than prior processes.

A specific object of our invention is to provide an improved process for the continuous production of chlorobenzene from benzene, hydrogen chloride and air.

Broadly stated, our invention comprises an improved process for halogenating an aromatic hydrocarbon which comprises contacting the reactants with a finely divided halogenation catalyst in the form of a relatively dense fluidized mass under halogenation conditions.

In accordance with our invention the reactants, which may comprise an oxygen-stable aromatic hydrocarbon, hydrogen halide and an oxygen-containing gas, must be in a vaporous condition and should be at a temperature of from about 200° C. to about 300° C. before being introduced into the reaction vessel. Any suitable means may be employed to vaporize and heat the reactants. For example, the reactants can be introduced into a vaporizer operated at a temperature of from about 140° C. to about 225° C. and preferably within the range of from about 200° C. to about 220° C. and the effluent from the vaporizer passed to a superheater operated at a temperature of from about 225° C. to about 260° C. and preferably within the range of from about 225° C. to about 240° C.

The vaporous, superheated reactants are then introduced into a reaction zone which contains a mass of catalyst particles maintained in a state of fluidization resembling a boiling liquid. Although the catalyst particles can be maintained in a fluidized state by using an inert gas as fluidizing medium, the combined reactant stream from the superheater is preferably passed up through the catalyst bed at sufficient velocity to maintain the particles in a relatively dense fluidized state. Velocities of from about 0.1 to about 1.5 ft./sec. have been found to be satisfactory when the catalyst particle size is between about 40 and about 200 mesh. Obviously, any combination of reactant vapors and inert gas can be used to maintain the desired conditions of fluidization.

The catalyst may be any halogenation catalyst, such as a halide of a metal having a variable valence or an oxide of such a metal which will convert to the corresponding halide in the presence of hydrogen halide. Supported copper chloride is a satisfactory catalyst for the chlorination of benzene and coprecipitated copper hydroxide-alumina has been found to be an excellent catalyst for the fluidized operation of our invention. Particles of any fluidizable size may be utilized but a preferred range of particles is between 40 and 200 mesh.

The reaction vessel may comprise any suitable closed vessel having provisions for introduction of reactants and separate withdrawal of catalyst particles and reaction effluent, but preferably comprises an outer shell having a conical bottom and an inner open-top vessel having a conical bottom. The reaction zone should be maintained at a temperature from about 150° C. to about 300° C. and preferably within the range of from about 190° C. to about 210° C. A portion of the catalyst particles is withdrawn from the reactor. When the preferred form of reactor is used, the fluidized catalyst bed is maintained in the inner vessel and a portion of the catalyst is caused to spill over the top of the inner vessel to the bottom of the reactor from which the catalyst can be withdrawn.

Withdrawn catalyst is then passed to a separate regenerator, which may be of fixed bed, moving bed or fluidized bed design. Preferably, the regenerator is constructed similarly to the reactor. The catalyst particles may be passed from the reactor to the regenerator by means of gravity flow, mechanical conveyor or gas lift. In the regenerator, tars and other impurities on the catalyst are removed by treating the catalyst with a regenerating gas, such as steam or an oxygen-containing gas, at a temperature within the range of from about 350° C. to about 500° C. Advantageously, the catalyst in the regeneration zone is maintained in a fluidized state, the preferred fluidizing medium comprising the regenerating gases. A portion of the catalyst particles is removed from the regenerator and passed to the reactor. This is preferably accomplished by suspending the regenerated catalyst particles in a stream of hot effluent gases from the regenerator and passing the suspension to a separation zone, such as a cyclone separator from which catalyst particles are removed and passed to the reactor. The hot gases removed from the separation zone may be passed to suitable means, such as a heat exchanger, for recovery of their useful heat. Obviously, other means may be used to pass the regenerated catalyst particles from the regenerator to the reactor. For example, inert gases can be used rather than regenerating gases or a mechanical conveyor can be used instead of a gas lift. A vaporous effluent containing the product is withdrawn from the reactor and passed to a separation system for recovery of the halogenated aromatic compound.

A suitable separation system comprises passing the effluent through a cyclone separator, to remove catalyst fines, to a packed column in order to condense the chlorinated hydrocarbon and some of the unreacted reactants. The condensed stream is then passed to a decanter where two immiscible layers are formed comprising a lower aqueous layer and an upper hydrocarbon layer. The hydrocarbon layer is passed to a fractionating column from which a substantially, pure halogenated aromatic product is recovered. Other recovery systems may be employed instead of the above described system. For example, the halogenated aromatic hydrocarbon can be extracted from the reaction effluent by countercurrently contacting the effluent with a solvent for the halogenated aromatic compound, such as a higher boiling halogenated aromatic compound.

Our process is particularly suitable as the first stage reaction of the Rashig Process for the production of phenol which comprises reacting benzene, hydrogen chloride and air in a first stage process to form monochlorobenzene and reacting the monochlorobenzene with steam in a second stage process to form phenol. The aqueous hydrogen chloride recovered from the second stage process is a suitable source of the hydrogen chloride feed when the process of our invention is utilized as the first stage process.

A more specific embodiment of our invention is described in detail below, in connection with the drawing.

The drawing is a schematic represenation of one method of operating in accordance with the teachings of our invention.

Referring now to the drawing, an aromatic hydrocarbon is passed through line 1 via line 2 to vaporizer 3. Hydrogen halide is passed through line 4 to vaporizer 3, and an oxygen-containing gas, such as air, is passed through line 5 to vaporizer 3. The vaporous effluent from vaporizer 3 is passed via line 6 to superheater 7. The effluent from superheater 7 is passed via line 8 into the bottom of reaction chamber 9, which is located within reactor 10. Reaction chamber 9 may be in the form of an inverted cone or other open-top vessel. A stream of finely divided catalyst particles is introduced into reactor 10 through dip leg 11, and forms a mass of catalyst particles in reaction chamber 9. The vaporous reactants introduced into chamber 9 via line 8 cause the mass of catalyst particles in reaction chamber 9 to assume a state resembling boiling liquid. A portion of the catalyst particles spills over the top of reaction chamber 9 and passes down to the bottom of reactor 10, from which it is conveyed through screw conveyor 12 via dip leg 13 to regenerator 15, where it forms a mass of catalyst particles in regeneration chamber 14. Sufficient catalyst is maintained in the bottom of reactor 10 to serve as a gas seal. Regeneration chamber 14 may be of a similar shape to reaction chamber 9. An oxygen-containing gas, such as air, is introduced through line 17 into the bottom of regeneration chamber 14 at a sufficiently high rate to maintain the catalyst in regeneration chamber 14 in a state resembling a boiling liquid. Tars and other foreign matter are burned off by the air in regeneration chamber 14. A portion of the particles spills over the lip of regeneration chamber 14 and drops to the bottom of regenerator 15. The hot effluent gases from regeneration chamber 14 leave the bottom of regenerator 15 and carry the regenerated catalyst particles from the bottom of regenerator 15 through line 16 to cyclone separator 18. The catalyst particles are separated from the hot gases in cyclone separator 18, and pass through screw conveyor 20 and line 11 to reaction chamber 9. Sufficient catalyst is maintained in the bottom of cyclone separator 18 to serve as a gas seal. The hot gases separated in cyclone separator 18 pass through line 19, from which they may be passed to suitable heat exchange means for recovery of their useful heat. A vaporous effluent comprising halogenated aromatic hydrocarbon, unconverted aromatic hydrocarbon and water, is withdrawn from the top of reactor 10 through line 21, and passed to cyclone separator 22. Catalyst fines are withdrawn from cyclone separator 22 through line 23, and may be discarded or recycled to reactor 10 by means of a suitable recycle line. A vaporous effluent is passed from cyclone separator 22 through line 24 to packed column 25 from which an aromatic hydrocarbon stream is withdrawn overhead and recycled through line 26 via line 33 to aromatic hydrocarbon feed line 2. A condensed liquid mixture of aromatic hydrocarbon, halogenated aromatic hydrocarbon and water is withdrawn from the bottom of column 25, and passed through line 27 to decanter 28, where two immiscible layers are formed. The lower aqueous layer is withdrawn from the bottom of decanter 28 through line 29 and the upper layer, comprising aromatic hydrocarbon and halogenated aromatic hydrocarbon, is withdrawn from the side of the decanter and passed through line 30 to fractionating column 31. Aromatic hydrocarbon is withdrawn overhead from column 31 and recycled through line 32 via line 33 to aromatic hydrocarbon feed line 2. Substantially pure halogenated aromatic hydrocarbon is withdrawn from the bottom of column 31 through line 34 as the product of the process.

The following example is given to illustrate the invention in more detail.

*Example I*

In an arrangement similar to that shown in the drawing 600 parts (by weight) of 40 to 200 mesh catalyst, comprising coprecipitated copper hydroxide and alumina, are charged to the reactor, which is maintained at a temperature of about 200° C. Benzene at a rate of 600 parts per hour, hydrochloric acid (17% conc.) at a rate of 100 parts per hour and air at a rate of 50–60 parts per hour are fed into the vaporizer, which is maintained at a temperature of about 140° C. The effluent from the vaporizer is passed to the superheater, which is operated at a temperature of about 240° C. From the superheater, the vapors pass through the catalyst bed in the reactor, where they effect a teetering action in the powdered catalyst resembling boiling liquid. As a result of this action, a portion of the catalyst spills over and out of the bed area, and drops to the bottom of the reactor, from which it is passed to the regenerator. In the regenerator, a stream of air feeding into the catalyst bed agitates the spent catalyst in the same manner as the vapor stream agitates the catalyst bed in the reactor. As the air stream passes through the spent catalyst, tars and other materials are burned off thus effecting regeneration of the catalyst. At the same time, a portion of the regenerated catalyst spills over the top of the catalyst bed and drops to the bottom of the regenerator, where it is picked up by the exiting gases and conveyed to a cyclone separator at the top of the reactor. The entrained catalyst is removed from the gas stream in the cyclone separator and is conveyed via a screw conveyor into the catalyst bed in the reactor. The hot gases from the cyclone separator are passed to a heat exchanger to recover their useful heat. About 10% of the benzene is converted to monochlorobenzene in the reactor. The effluent vapors from the reactor, comprising monochlorobenzene, unconverted benzene and water, are passed through a cyclone separator to remove any entrained catalyst. The vapors are then passed up through the recovery column, which comprises a packed column. Benzene vapors are withdrawn from the top of the recovery column and a condensed liquid mixture of benzene, chlorobenzene and water is drawn off the bottom. The benzene stream is recycled to the reactor and the condensed liquid mixture is passed to the decanter. A bottom layer of water is removed from the decanter and a top organic layer, comprising benzene and chlorobenzene, is passed to the frictionating column. Benzene vapor is removed from the top of the fractionating column and recycled to the reactor, while monochlorobenzene is removed from the bottom of the fractionating column as the product of the process.

From a reading of the preceding description of our invention, it can be seen that we have provided a simple, efficient and economical process for halogenating aromatic hydrocarbons. By conducting the halogenation reaction in a fluidized catalyst bed, we obtain numerous advantages over the prior art. We obtain better contact between catalyst and reactants and our process, therefore, requires less catalyst than prior fixed bed processes. In addition, our catalyst bed is constantly maintained at a high level of activity due to the continuous regeneration of the catalyst particles. Several important advantages of our process are obtained due to the fact that it does not require periodic shutdowns for replacement or regeneration of catalyst. This means that we can operate our process more economically than prior art processes, since we eliminate the expense of frequent replacement of catalyst particles and the heat and product losses which accompany periodic regeneration of catalyst particles. In addition, by eliminating periodic shutdowns for replacement or regeneration of catalyst, we completely eliminate the corrosion problems which would otherwise be present due to the condensation of water resulting from the reduced temperatures during shutdowns. Continuous operation also has the obvious advantage that no production time is lost due to periodic shutdowns for regeneration or replacement of the catalyst. Other advantages of our fluidized catalyst operation of our invention are uniformity of temperature throughout the reaction zone, resulting in greatly reduced tendency to form side products as a result of localized overheating, easier control of temperature in the reaction zone because of the excellent heat transfer characteristics of the fluidized catalyst particles, and simplicity of transfer of the catalyst particles from one zone to another.

What is claimed is:

1. A continuous process for chlorinating benzene, which comprises introducing a finely divided copper hydroxide-alumina catalyst having a particle size in the range of 40 to 200 mesh into a reaction zone while maintaining a temperature in said reaction zone of about 190° C. to about 210° C., suspending said catalyst particles in a stream of benzene vapor, hydrogen chloride and air to form a relatively dense fluidized mass in said reaction zone, continuously removing a portion of said catalyst particles from said reaction zone, and removing the tarry surface contaminates formed thereon in the reaction zone by suspending said catalyst particles in a stream of a gas selected from the group consisting of steam, oxygen, and air at a temperature from about 350° C. to 500° C., and passing said clean surfaced regenerated catalyst particles to the reaction zone, continuously removing reaction effluent from said reaction zone and recovering chlorobenzene from said reaction effluent.

2. A continuous process for chlorinating benzene, which comprises introducing a finely divided copper hydroxide-alumina catalyst having a particle size in the range of 40 to 200 mesh into a reaction zone while maintaining a temperature in said reaction zone of about 190° C. to about 210° C., suspending said catalyst particles in a stream of benzene vapor, hydrogen chloride and air to form a relatively dense fluidized mass in said reaction zone, continuously removing a portion of said catalyst particles from said reaction zone, and removing the tarry surface contaminates formed thereon in the reaction zone by suspending said catalyst particles in a stream of air at a temperature from about 350° C. to 500° C., and passing said clean surfaced regenerated catalyst particles to the reaction zone, continuously removing reaction effluent from said reaction zone and recovering chlorobenzene from said reaction effluent.

References Cited in the file of this patent

UNITED STATES PATENTS

| 1,963,761 | Prahl | June 19, 1934 |
| 2,602,021 | Belchetz | July 1, 1952 |

FOREIGN PATENTS

| 487,596 | Germany | Dec. 12, 1929 |
| 720,079 | Germany | Apr. 23, 1942 |